United States Patent
Bayer et al.

(10) Patent No.: US 8,123,487 B2
(45) Date of Patent: Feb. 28, 2012

(54) ROTOR FOR A TURBO ENGINE

(75) Inventors: Erwin Bayer, Dachau (DE); Bertram Kopperger, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 1207 days.

(21) Appl. No.: 10/582,694

(22) PCT Filed: Nov. 20, 2004

(86) PCT No.: PCT/DE2004/002571
§ 371 (c)(1),
(2), (4) Date: Jul. 6, 2007

(87) PCT Pub. No.: WO2005/056983
PCT Pub. Date: Jun. 23, 2005

(65) Prior Publication Data
US 2008/0025844 A1    Jan. 31, 2008

(30) Foreign Application Priority Data
Dec. 13, 2003   (DE) .................................. 103 58 421

(51) Int. Cl.
*B64C 11/04*      (2006.01)
(52) U.S. Cl. .................................................. 416/219 R
(58) Field of Classification Search .................. 416/215, 416/214 A, 214 R, 220 R, 221, 248, 219 R, 416/220 A, 219 A, 204 A; 29/889.21
See application file for complete search history.

(56) References Cited

U.S. PATENT DOCUMENTS

| | | | | |
|---|---|---|---|---|
| 1,325,208 A | * | 12/1919 | Rice ............................... | 416/215 |
| 1,470,499 A | * | 10/1923 | Steenstrup .................. | 29/889.21 |
| 2,264,877 A | * | 12/1941 | Hezekiah .................... | 415/209.4 |
| 2,494,658 A | * | 1/1950 | Highberg et al. ............. | 416/215 |
| 2,988,324 A | * | 6/1961 | Sutters ....................... | 416/201 R |
| 3,532,438 A | | 10/1970 | Freyman et al. | |
| 3,625,634 A | * | 12/1971 | Stedfeld .................... | 416/198 R |
| 4,339,229 A | * | 7/1982 | Rossman ...................... | 416/218 |
| 4,397,609 A | * | 8/1983 | Kochendorfer ........... | 416/214 R |
| 4,684,325 A | * | 8/1987 | Arnold .......................... | 416/215 |
| 4,743,166 A | * | 5/1988 | Elston et al. ................. | 416/215 |
| 5,061,152 A | * | 10/1991 | Marey ........................... | 415/150 |
| 5,263,823 A | * | 11/1993 | Cabaret et al. ............... | 416/218 |
| 5,332,360 A | * | 7/1994 | Correia et al. ............. | 415/209.3 |
| 5,421,703 A | * | 6/1995 | Payling ....................... | 415/209.4 |
| 5,474,419 A | * | 12/1995 | Reluzco et al. ............ | 415/209.4 |
| 5,797,725 A | * | 8/1998 | Rhodes ....................... | 415/209.2 |
| 5,941,688 A | | 8/1999 | Dambrine | |
| 6,086,327 A | * | 7/2000 | Mack et al. .................... | 415/160 |
| 6,790,000 B2 | * | 9/2004 | Wolf .............................. | 415/165 |

FOREIGN PATENT DOCUMENTS

| | | |
|---|---|---|
| CH | 497 641 | 10/1970 |
| DE | 2 027 861 | 12/1971 |
| DE | 101 63 951 C1 | 12/2002 |
| GB | 1266976 | 3/1972 |

* cited by examiner

*Primary Examiner* — Nathaniel Wiehe
*Assistant Examiner* — Aaron R Eastman
(74) *Attorney, Agent, or Firm* — Crowell & Moring LLP

(57) ABSTRACT

A rotor for a turbo engine is disclosed including a rotor base body and a plurality of rotor blades distributed over the circumference of the rotor base body. The rotor base body is formed by at least one ring-shaped element made of a metal matrix composite material. The rotor blades are attached by footing to the rotor base body in such a way that the footing is positioned in a fiber-free area of the rotor base body.

2 Claims, 3 Drawing Sheets

ROTOR FOR A TURBO ENGINE

This application claims the priority of International Application No. PCT/DE2004/002571, filed Nov. 20, 2004, and German Patent Document No. 103 58 421.8, filed Dec. 13, 2003, the disclosures of which are expressly incorporated by reference herein.

BACKGROUND AND SUMMARY OF THE INVENTION

The invention relates to a rotor for a turbo engine, in particular a gas turbine.

According to the state of the art, a distinction is made in principle between two types of rotors for a turbo engine, namely so-called integrally bladed rotors and rotors in which the blades are inserted, i.e., anchored, in a rotor base body by a footing.

Integrally bladed rotors are referred to either as BLISK (bladed disk) or BLING (bladed ring), depending on whether the rotor base body is disk-shaped or ring-shaped. In such integrally bladed rotors, the rotor blades are fixedly connected to the ring-shaped or disk-shaped rotor base body and thus form an integral part of the rotor base body. Production of such integrally bladed rotors is complex and may be performed, for example, by milling from a solid on a 5-axis milling machine. One disadvantage of integrally bladed rotors in a BLING or BLISK design is the poor possibility of repairing them.

Rotors in which the rotor blades are inserted into the rotor base body via footing are easier to manufacture and repair than integrally bladed rotors but they are much heavier than integrally bladed rotors because the connection of the rotor blades to the rotor base body by way of the blade footing is under high stresses due to centrifugal forces and therefore must be designed with a reliable construction. In the related art, the rotor base body is designed in the shape of a disk in rotor designs in which the rotor blades are anchored in the rotor base body via the footing. The disk-shaped design of the rotor base body and the connection of the rotor blades to the rotor base body via suitably dimensioned blade feet results in a heavy weight of the rotor, which is a disadvantage of this design principle.

Against this background, the object of the present invention is to propose a novel rotor for a turbo engine, in particular for a gas turbine.

According to this invention, the rotor base body is formed by at least one ring-shaped element made of a metal matrix composite material (MMC material), where the rotor blades are attached to the rotor base body by footing so that the footing is positioned in a fiber-free area of the rotor base body.

In the sense of the present invention, a rotor for a turbo engine is proposed, preferably having a low weight on the one hand while being easy to manufacture and repair on the other hand. Thus, in the sense of the present invention, the rotor base body is formed from at least one ring-shaped element made of a metal matrix composite material. The design of the rotor base body has at least one ring-shaped element and, manufacturing it by the MMC technology, allows a definite weight reduction in comparison with the rotors known from the related art. In addition, individual rotor blades can be replaced easily when repairing the rotor.

According to an advantageous refinement of the present invention, the rotor base body is comprised of two ring-shaped elements made of a metal matrix composite material (MMC material), the rotor blades being attached between the two ring-shaped elements on the outer end radially. Blade feet of the rotor blades engage in a corresponding recess, i.e., indentation in the area of the ring-shaped elements, namely between fiber-reinforced areas of the two ring-shaped elements. Each rotor blade is preferably positioned with one platform each between peripheral protrusions of the two ring-shaped elements that are on the outside radially, with the ends of the platforms being in contact with the peripheral protrusions.

According to an alternative advantageous embodiment of the present invention, the rotor base body is formed by a ring-shaped element made of a metal matrix composite material (MMC material), sections of the ring-shaped element on the outside axially being fiber-reinforced and a section in between being designed to be fiber-free, with the blade footing of the rotor blades being secured in the fiber-free section. Boreholes running radially are preferably created in the fiber-free section of the ring-shaped element, each rotor blade being anchored by footing in a borehole.

BRIEF DESCRIPTION OF THE DRAWINGS

Exemplary embodiments of the present invention are explained in greater detail on the basis of the drawings, without being limited thereto. They show.

DETAILED DESCRIPTION OF THE DRAWINGS

The present invention is described in greater detail below with reference to FIGS. 1 through 4.

Figure 1:
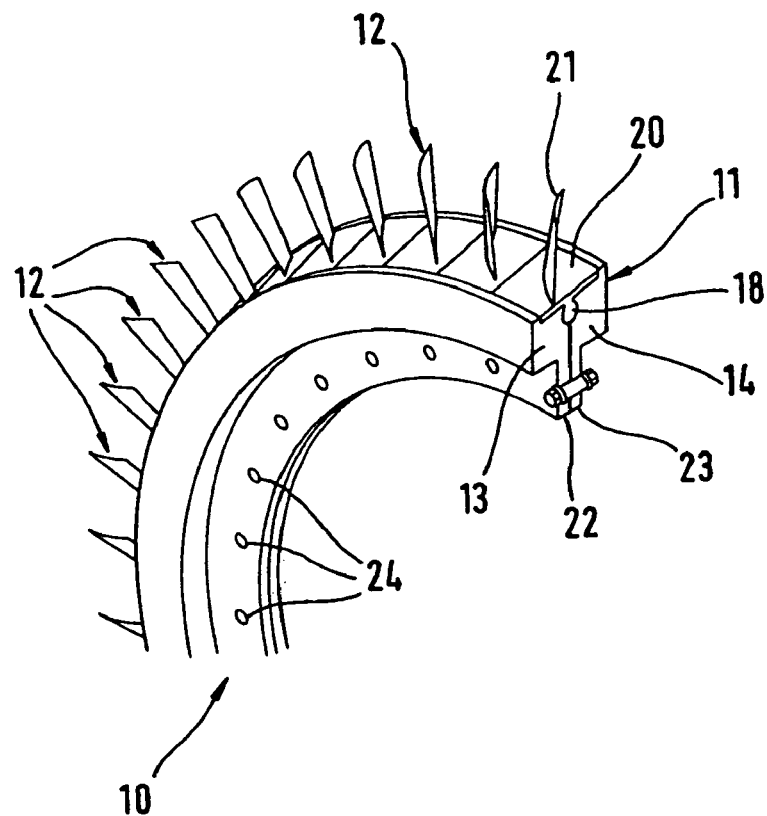
FIG. 1 illustrates a detail of an inventive rotor according to a first exemplary embodiment of the invention shown in a schematic perspective side view.
Figure 2:
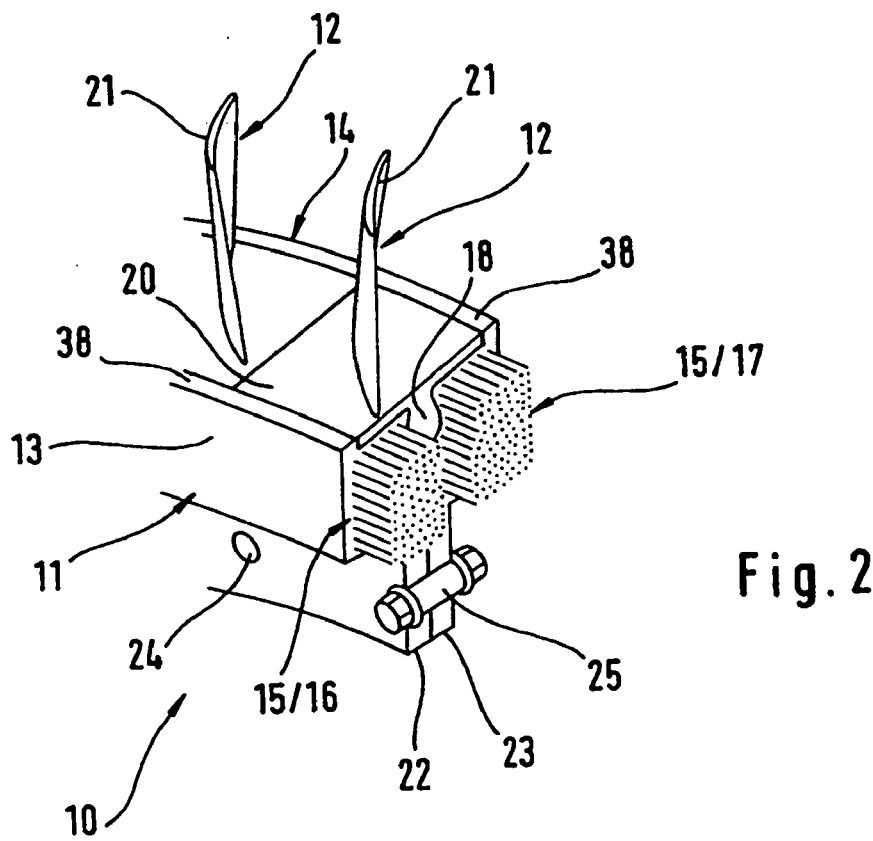
FIG. 2 illustrates an enlarged detail of the rotor according to FIG. 1.
Figure 3:
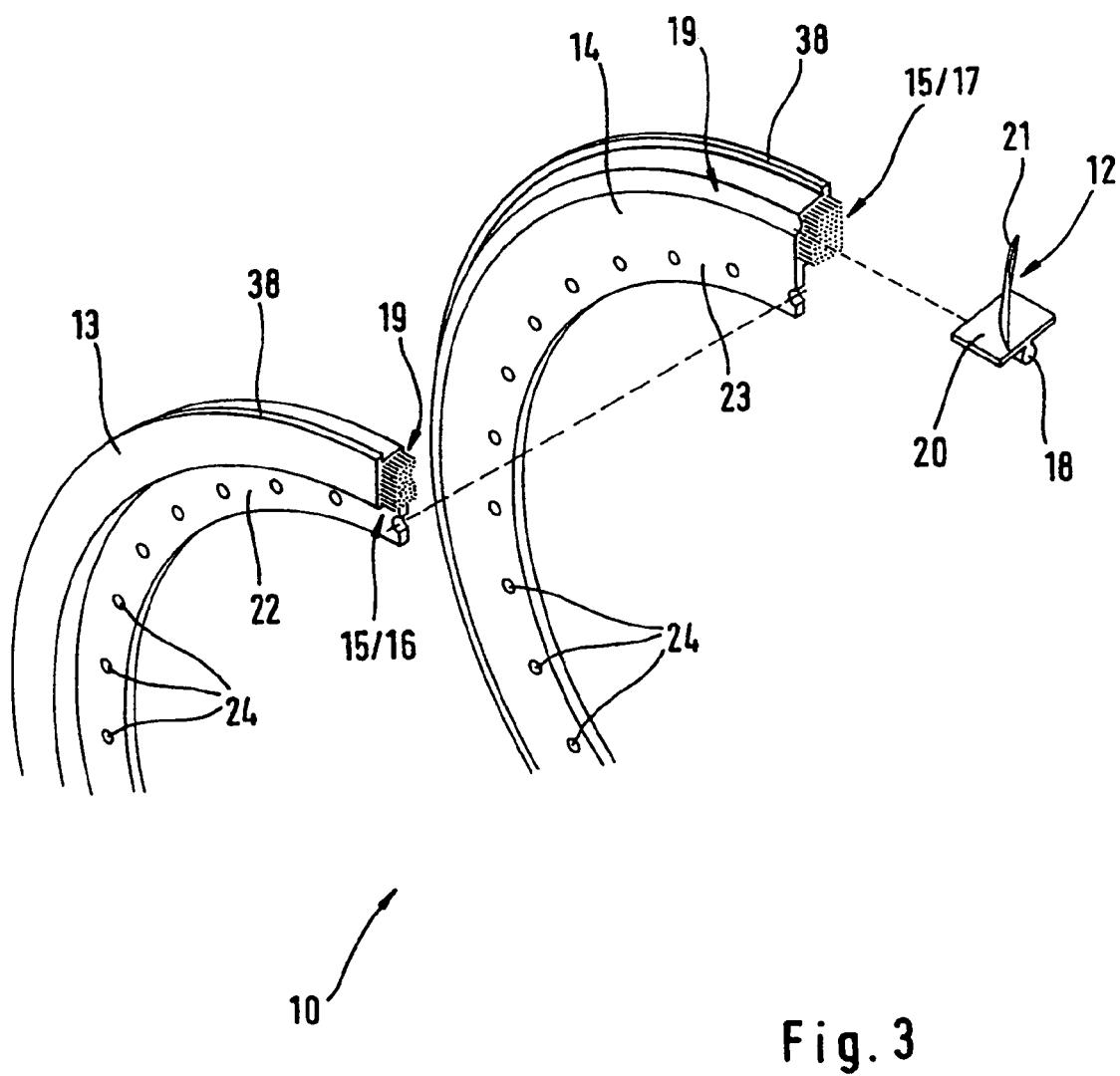
FIG. 3 illustrates the rotor according to FIG. 1 in an exploded diagram.

FIGS. 1 through 3 show an inventive rotor 10 for a turbo engine, in particular for a gas turbine, in different views. FIG. 1 shows a detail of the rotor 10 in a perspective side view, with FIG. 1 showing an approximately 90° detail, i.e., a quarter circle detail of the essentially closed rotor 10. FIG. 2 shows an enlarged detail of the rotor 10 in the area of two rotor blades; FIG. 3 shows an exploded diagram of the rotor 10. The rotor 10 is preferably used in a turbine or a compressor of an aircraft engine.

The rotor 10 according to FIGS. 1 through 3 has a rotor base body 11 plus multiple rotor blades 12 distributed over the circumference of the rotor base body 11. It is within the scope of the present invention for the rotor base body 11 to be formed by at least one ring-shaped element made of a metal matrix composite material and for the rotor blades 12 to be attached to the rotor base body by footing in such a way that the footing is positioned in a fiber-free area of the rotor base body 11.

In the exemplary embodiment according to FIGS. 1 through 3, the rotor base body 11 is made of two ring-shaped elements 13 and 14, the two ring-shaped elements 13 and 14 each being made of a metal matrix composite material. This can be seen in FIGS. 2 and 3 in particular, where the high-tensile fibers 15 are integrated into the metal matrix material of the ring-shaped elements 13 and 14 are shown in schematic diagrams. In the exemplary embodiment illustrated in FIGS. 1 through 3, each of the two ring-shaped elements 13 and 14 has a corresponding area 16 and/or 17 in which the high-tensile fibers 15 are located, this area thus being designed as a fiber-reinforced area.

The rotor blades 12 are mounted on the outer end radially of the rotor base body 12 between the two ring-shaped elements 13 and 14, each rotor blade 12 being positioned with a footing 18 between the fiber-reinforced areas 16 and 17 of the two ring-shaped elements 13 and 14. As shown in FIG. 3 in particular, the two ring-shaped elements 13 and 14 each have a recess, i.e., indentation 19 in which the footing 18 engages in the assembled state of the rotary 10. The inside contour of the recesses 19 is thus adapted to the outside contour of the blade feet 18.

As can be seen in FIG. 2 in particular, a platform 20 of the rotor blades 12 is connected to the footing 18 of the rotor blades 12; in the installed state of the rotor 10, the ends of the platforms 20 that are on the outside axially are in contact with peripheral protrusions 38 that are on the outside radially of the two ring-shaped elements 13 and 14. The platforms 20 of the rotor blades 20 are thus flush with the protrusions 38 on the radially outer end of the ring-shaped elements 13 and 14. Starting from the platforms 20, the blade pans 21 of the rotor blades 12 extend radially outward.

The two ring-shaped elements 13 and 14 of the rotor base body 11 are joined together on the sections 22 and/or 23 that are on the inside radially. The sections 22 and 23 on the inside radially, where the ring-shaped elements 13 and 14 are joined together, are designed to be fiber-free. Several boreholes 24 distributed over the circumference are introduced into these sections 22 and 23 that are on the inside radially. For detachable connection of the two ring-shaped elements 13 and 14, bolt-like screw connectors 25 engage in these boreholes 24. Thus, the two ring-shaped elements 13 and 14 of the rotor base body 11 are securely held together by the screw connectors 25 and the rotor blades 12 are securely anchored by their footing 18 in the corresponding recesses 19 in the ring-shaped elements 13 and 14. The exemplary embodiment illustrated in FIGS. 1 through 3 has a particularly simple design of the inventive rotor.

Figure 4:
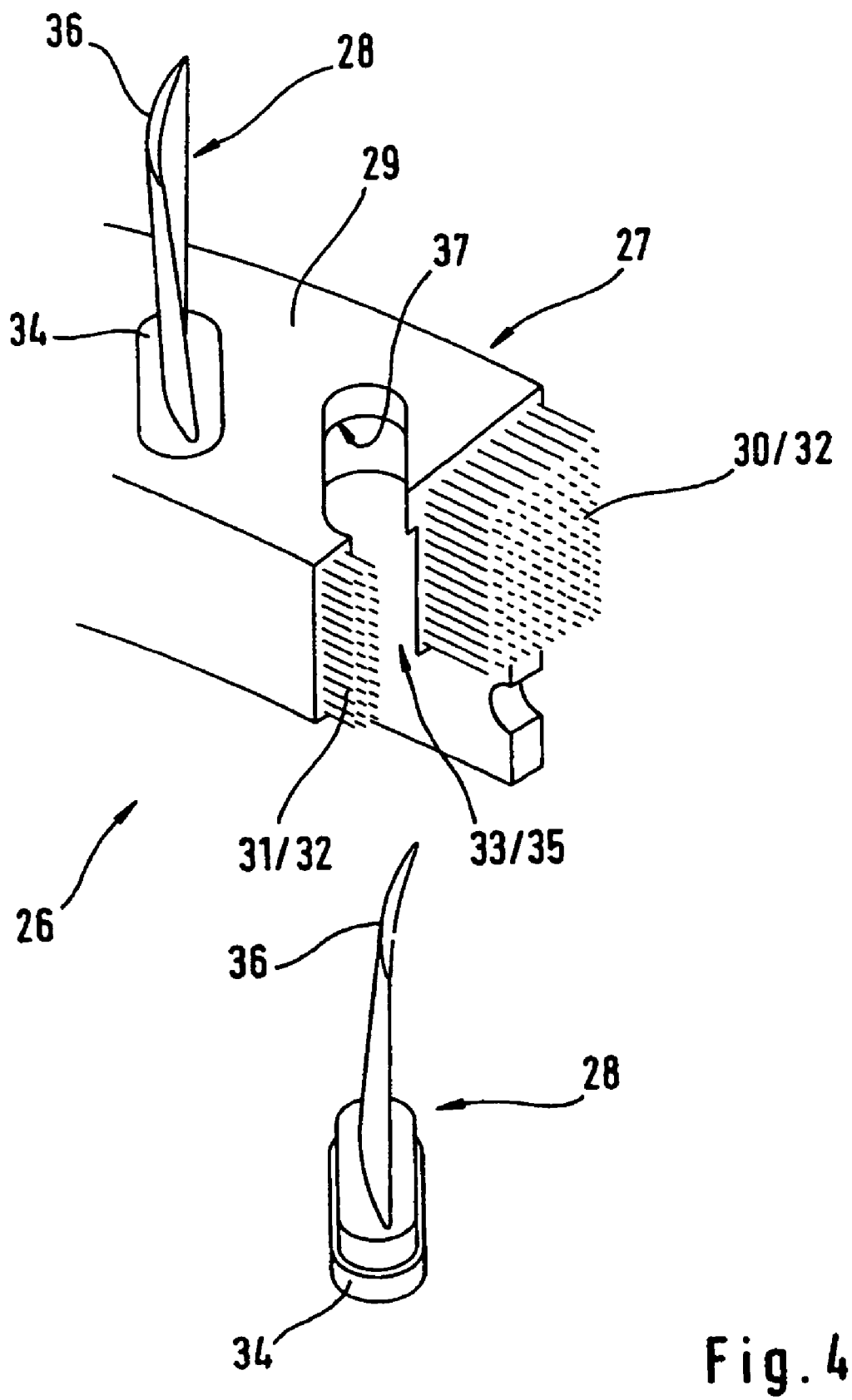
FIG. 4 illustrates a detail of an inventive rotor according to a second exemplary embodiment of the present invention in a schematic perspective side view.

FIG. 4 shows a second exemplary embodiment of an inventive rotor 26. The rotor 26 of the embodiment of FIG. 4 also has a rotor base body 27 and a plurality of rotor blades 28 distributed over the circumference of the rotor base body 27. In the exemplary embodiment in FIG. 4, the rotor base body 27 is formed by a ring-shaped element 29, with the ring-shaped element 29 being made of a metal matrix composite material.

The ring-shaped element 29 of the exemplary embodiment of FIG. 4 thus has a fiber-reinforced area 30 and/or 31 on the axially outer sections; FIG. 4 shows schematically the high-tensile fibers 32 running inside the fiber-reinforced areas 30 and 31. In an inner section axially, i.e., between the two areas 30 and 31, the ring-shaped element 29 has a fiber-free section 33. The rotor blades 28 are mounted with footing 34 on the ring-shaped element 29 of the rotor base body 27 in this fiber-free section 33.

As FIG. 4 indicates, boreholes 35 running radially are created in the fiber-free section 33 of the ring-shaped element 29. The rotor blades 28 can be inserted into the boreholes 35 from a position on the inside radially, whereby according to FIG. 4 a rotor blade 28 is insertable into a borehole 35 beginning with the blade pan 36. The rotor blade 28 is then forced radially outward until the footing 34 of the rotor blade 28 comes to rest against a stop 37 integrated into the borehole 35. The stop 37 thus limits the outwardly directed radial displaceability of the rotor blades 28 in the boreholes 35.

Rotor blades 36 inserted into the boreholes 35 are held in this position by a retaining ring (not shown). The retaining ring that is not shown is in contact with the radially inside end of the boreholes 35 over the entire circumference of the ring-shaped element 29, pressing radially outward so that the rotor blades 28 are rigidly connected to the ring-shaped element 29 in an airtight connection. To increase the strength of the ring-shaped element 29, the high-tensile fibers 32 may be wrapped around the boreholes 35 in a sinusoidal or cosinusoidal form in the area of the boreholes 35.

These two exemplary embodiments having in common the fact that at least one ring-shaped element made of a metal matrix composite material is used as the rotor base body. The ring-shaped element or each ring-shaped element of the rotor base body has at least one fiber-reinforced section and/or area and at least one fiber-free area, with the footing of the rotor blades running in the fiber-free area of the ring-shaped element or each ring-shaped element. A definite weight reduction for rotors of a turbo engine can be achieved with such a design. Furthermore, such rotors are easy to manufacture and repair.

The invention claimed is:

1. A rotor for a turbo engine, comprising:
   a rotor base body, wherein the rotor base body includes a fiber-reinforced area and a fiber-free area; and
   a rotor blade with a footing;
   wherein the footing is positioned in the rotor base body in the fiber-free area;
   wherein the rotor base body includes a ring-shaped element and wherein the ring-shaped element includes the fiber-reinforced area and the fiber-free area;
   wherein the ring-shaped element includes a second fiber-reinforced area and wherein the fiber-free area is disposed between the fiber-reinforced area and the second fiber-reinforced area;
   and wherein the fiber-free area defines a borehole and wherein the footing is positioned in the borehole.

2. The rotor according to claim 1, wherein the borehole includes a stop and wherein the footing engages the stop.

* * * * *